US006369824B1

(12) United States Patent
Lee

(10) Patent No.: US 6,369,824 B1
(45) Date of Patent: Apr. 9, 2002

(54) COMPUTER SYSTEM HAVING AN INTEGRATED CORE AND GRAPHIC CONTROLLER DEVICE CAPABLE OF ACCESSING MEMORY DATA SIMULTANEOUSLY FROM A SYSTEM MEMORY POOL AND A SEPARATE STAND-ALONE FRAME BUFFER MEMORY POOL

(75) Inventor: Ming-Shien Lee, Hsin-Chu (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 0 days.

(21) Appl. No.: 09/307,391

(22) Filed: May 7, 1999

(51) Int. Cl.[7] .............................................. G06F 13/14
(52) U.S. Cl. ...................... 345/520; 345/519; 710/126; 710/128; 710/129
(58) Field of Search ................................ 345/519, 520, 345/501, 531, 532, 534; 710/100, 126–129

(56) References Cited

U.S. PATENT DOCUMENTS 5,867,180 A * 2/1999 Katayama et al. .......... 345/519
6,232,990 B1 * 5/2001 Poirion ....................... 345/519
6,292,201 B1 * 9/2001 Chen et al. .................. 345/519

* cited by examiner

Primary Examiner—Kee M. Tung
(74) Attorney, Agent, or Firm—Ladas & Parry

(57) ABSTRACT

A computer system includes an integrated core and graphic controller device having a core logic controller portion and a graphic controller portion, a system memory pool, and a stand-alone frame buffer memory pool separate from the system memory pool. A first memory data bus interconnects the integrated core and graphic controller device and the system memory pool. A second memory data bus interconnects the integrated core and graphic controller device and the frame buffer memory pool. A memory address and control signal bus interconnects the integrated core and graphic controller device, the system memory pool and the frame buffer memory pool. The graphic controller portion of the integrated core and graphic controller device generates a same set of address signals received by the system memory pool and the frame buffer memory pool via the memory address and control signal bus such that the graphic controller portion is able to access simultaneously first word part display data from the system memory pool via the first memory data bus and second word part display data from the frame buffer memory pool via the second memory data bus.

6 Claims, 4 Drawing Sheets

COMPUTER SYSTEM HAVING AN INTEGRATED CORE AND GRAPHIC CONTROLLER DEVICE CAPABLE OF ACCESSING MEMORY DATA SIMULTANEOUSLY FROM A SYSTEM MEMORY POOL AND A SEPARATE STAND-ALONE FRAME BUFFER MEMORY POOL

BACKGROUND OF THE INVENTION

1. Field of the Invention

The invention relates to a computer system, more particularly to one having an integrated core and graphic controller device capable of accessing memory data simultaneously from a system memory pool and a separate stand-alone frame buffer memory pool.

2. Description of the Related Art

Referring to FIG. 1, a conventional personal computer system 1 is shown to comprise a central processing unit (CPU) 10, a host bus 11 connected to the CPU 10, a core logic 12 connected to the host bus 11, a memory bus 13 connected to the core logic 12, a system memory pool 14 connected to the memory bus 13, an input/output (I/O) bus 15 connected to the core logic 12, at least one peripheral device 16 connected to the I/O bus 15, an Advanced Graphic Port (AGP) bus 17 connected to the core logic 12, a stand-alone graphic accelerator (VGA) card 18 connected to the AGP bus 17, and a monitor 19 connected to the VGA card 18. The VGA card 18 includes a VGA chip 181, a local frame buffer 182 formed from dynamic memory, and a flash memory 183 for VGA BIOS.

Referring to FIG. 2, it has been proposed heretofore in another conventional personal computer system 2 to discard the stand-alone VGA card 18, and mount the VGA chip 181 and the local frame buffer 182 directly on the system board (not shown) to reduce costs and simplify manufacture of the system board.

Due to continued growth in multimedia applications, VGA processing needs more memory bandwidth and faster computing capability for larger data access to maintain optimum display quality and performance. Since the traditional VGA 64-bit frame buffer memory data (MD) bus cannot meet the performance target, a 128-bit frame buffer MD architecture has been proposed. The 128-bit MD bus lines allow the VGA chip to access 128-bit data per memory transaction to result in doubling of the performance as compared with the traditional 64-bit MD scheme. FIG. 3 illustrates a proposed computer system 3 having a VGA chip 381 connected to a local frame buffer 383 via a 128-bit frame buffer MD bus 382. Although VGA performance is improved, too many memory pins are needed to make the proposed computer system 3 work. In a recommended memory signal layout on a system board, the layout trace width is about 6 mil, the spacing between traces is about 6 mil, the via hole diameter is about 12 mil, and the spacing between via is about 50 mil. Thus, for the proposed computer system 3, at least 6×64×2=768 mil is needed for the additional 64-bit MD signal lines, and more than 400 mil is spent for additional memory address and control signal lines. Therefore, the system board has to be enlarged to obtain sufficient trace space and for reasonable trace layout routing. This violates the trend toward making the system board more compact and more cost effective. In addition, the 128-bit MD bus lines will dramatically complicate the chipset-to-memory layout and will degrade the signal quality during run time. If BGA layout concerns are to be included, there is a need to reserve more space on the system board for extra signal pads or via holes. This further complicates the configuration of the system board and can cause heat distribution problems according to BGA design rules. Aside from the aforesaid disadvantages, in order to obtain the bandwidth benefit from the 128-bit MD bus lines in the proposed computer system 3, a two-bank graphic memory is needed to make the 128-bit MD bus lines feasible. This also violates the trend toward low-cost computer systems and high-density memory chips. In summary, too many pin counts not only result in an unacceptable increase in chip size, but also complicate the system board space/routing.

In co-pending U.S. patent application Ser. Nos. 09/199,270 and 09/199,478, the applicant disclosed a computer system including an integrated core and graphic controller device that incorporates both core logic controller and graphic controller functions, and a system memory that is shared by both the core logic controller portion and the graphic controller portion of the integrated core and graphic controller device, thereby achieving a unified memory architecture (UMA) that results in cost savings by reducing the system board space and the components on the system board. In addition, the system board space/routing effort and the memory bus pin counts are also minimized in the disclosed computer systems. However, if the 64-bit memory data bus is replaced by a 128-bit memory data bus in the disclosed computer systems to achieve better VGA performance, the problems of increased memory pin count and increased complexity of the system board space/routing will still be encountered.

SUMMARY OF THE INVENTION

Therefore, the object of the present invention is to provide an integrated core and graphic controller device capable of accessing memory data simultaneously from a system memory pool and a separate stand-alone frame buffer memory pool, whereby the benefit of more memory access bandwidth associated with 128-bit frame buffer memory data lines can be obtained for optimum graphical performance at the lowest memory pin count and without complicating the system board space/routing.

According to the present invention, a computer system comprises an integrated core and graphic controller device including a core logic controller portion and a graphic controller portion, a system memory pool, and a stand-alone frame buffer memory pool separate from the system memory pool. A first memory data bus interconnects the integrated core and graphic controller device and the system memory pool. A second memory data bus interconnects the integrated core and graphic controller device and the frame buffer memory pool. A memory address and control signal bus interconnects the integrated core and graphic controller device, the system memory pool and the frame buffer memory pool. The graphic controller portion of the integrated core and graphic controller device is capable of generating a same set of address signals received by the system memory pool and the frame buffer memory pool via the memory address and control signal bus such that the graphic controller portion is able to access simultaneously first word part display data from the system memory pool via the first memory data bus and second word part display data from the frame buffer memory pool via the second memory data bus.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
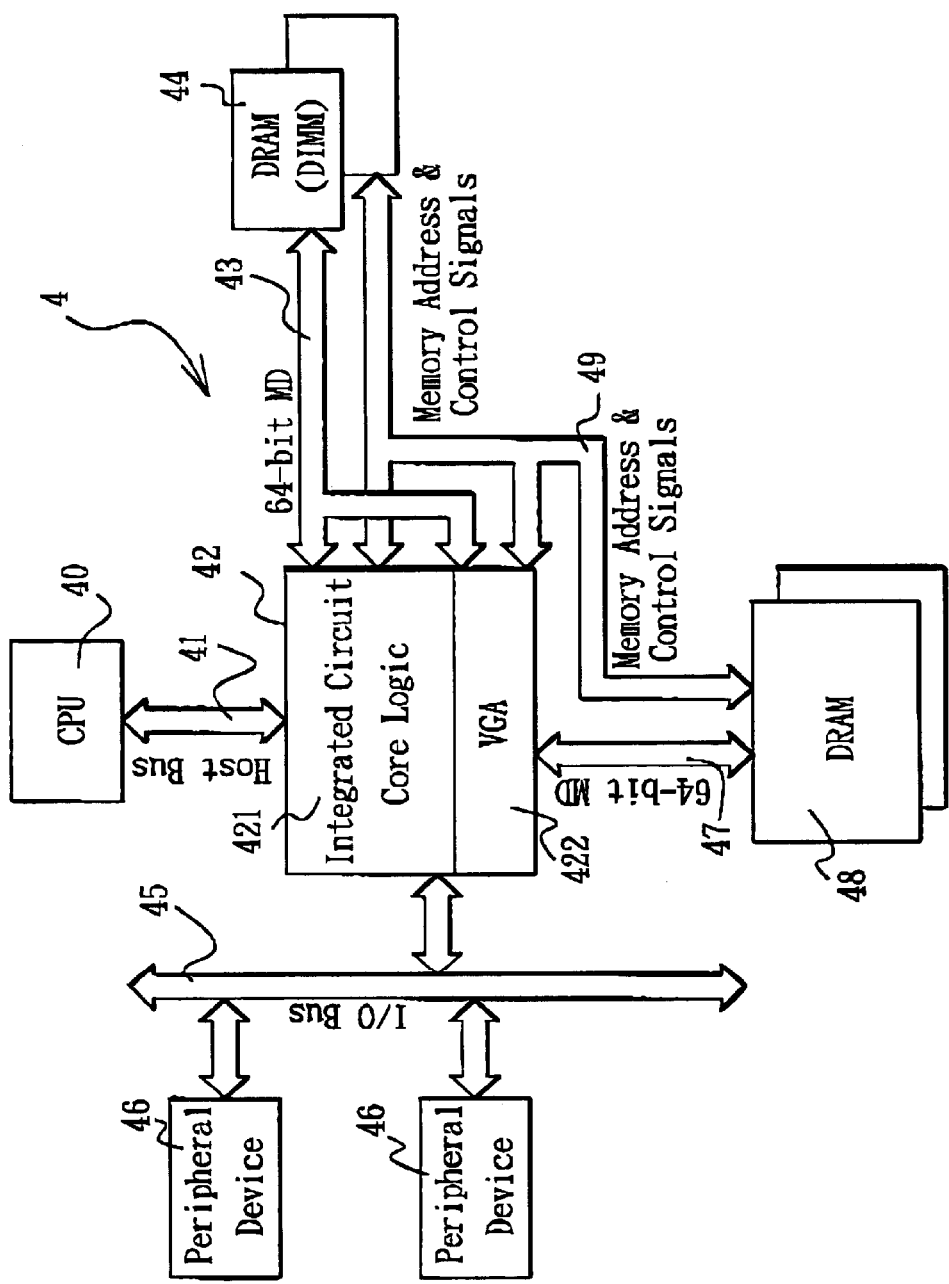
FIG. 4 is a schematic circuit block diagram of the preferred embodiment of a computer system according to the present invention.

Referring to FIG. 4, the preferred embodiment of a computer system 4 according to the present invention is shown to comprise a central processing unit (CPU) 40, a host bus 41 connected to the CPU 40, an integrated core and graphic controller device 42 connected to the host bus 41, a 64-bit quad-word first memory data bus 43 connected to the integrated core and graphic controller device 42, a system memory pool 44 connected to the first memory data bus 43, an input/output (I/O) bus 45 connected to the integrated core and graphic controller device 42, at least one peripheral device 46 connected to the I/O bus 45, a 64-bit quad-word second memory data bus 47 connected to the integrated core and graphic controller device 42, a stand-alone VGA-dedicated frame buffer memory pool 48 connected to the second memory data bus 47 and separate from the system memory pool 44, and a memory address and control signal bus 49 interconnecting the integrated core and graphic controller device 42, the system memory pool 44 and the frame buffer memory pool 48. Preferably, the system memory pool 44 is formed from standard DIMM, while the frame buffer memory pool 48 is formed from discrete DRAM chips.

The integrated core and graphic controller device 42 includes a core logic controller portion 421 and a VGA graphic controller portion 422. The architecture of the computer system 4 permits the graphic controller portion 422 of the integrated core and graphic controller device 42 to access the frame buffer memory pool 48 via the second memory data bus 47, and to share access to the system memory pool 44 with the core logic controller portion 421 via the first memory data bus 43. Particularly, during VGA processing, the graphic controller portion 422 generates a same set of address signals received by the system memory pool 44 and the frame buffer memory pool 48 via the memory address and control signal bus 49 such that the graphic controller portion 422 is able to access simultaneously low-quad-word (64-bit MD) part display data from a lowest bank of the system memory pool 44 via the first memory data bus 43, and high-quad-word (64-bit MD) part display data from the frame buffer memory pool 48 via the second memory data bus 47. Thus, due to the presence of the two memory data bus 43, 47 that are connected to the two separate memory pools 44, 48, the integrated core and graphic controller device 42 can perform bi-quad-word (128-bit) memory data transactions without incurring an increase in memory pin count for each of the memory pools 44, 48.

As to how the graphic controller portion 422 shares access to the system memory pool 44 with the core logic controller portion 421, this can be done with the use of a built-in unified memory control unit (not shown) of the integrated core and graphic controller device 42, such as the ones described in the computer systems disclosed in co-pending U.S. patent application Ser. Nos. 09/199,270 and 09/199,478 by the applicant.

Figure 1:
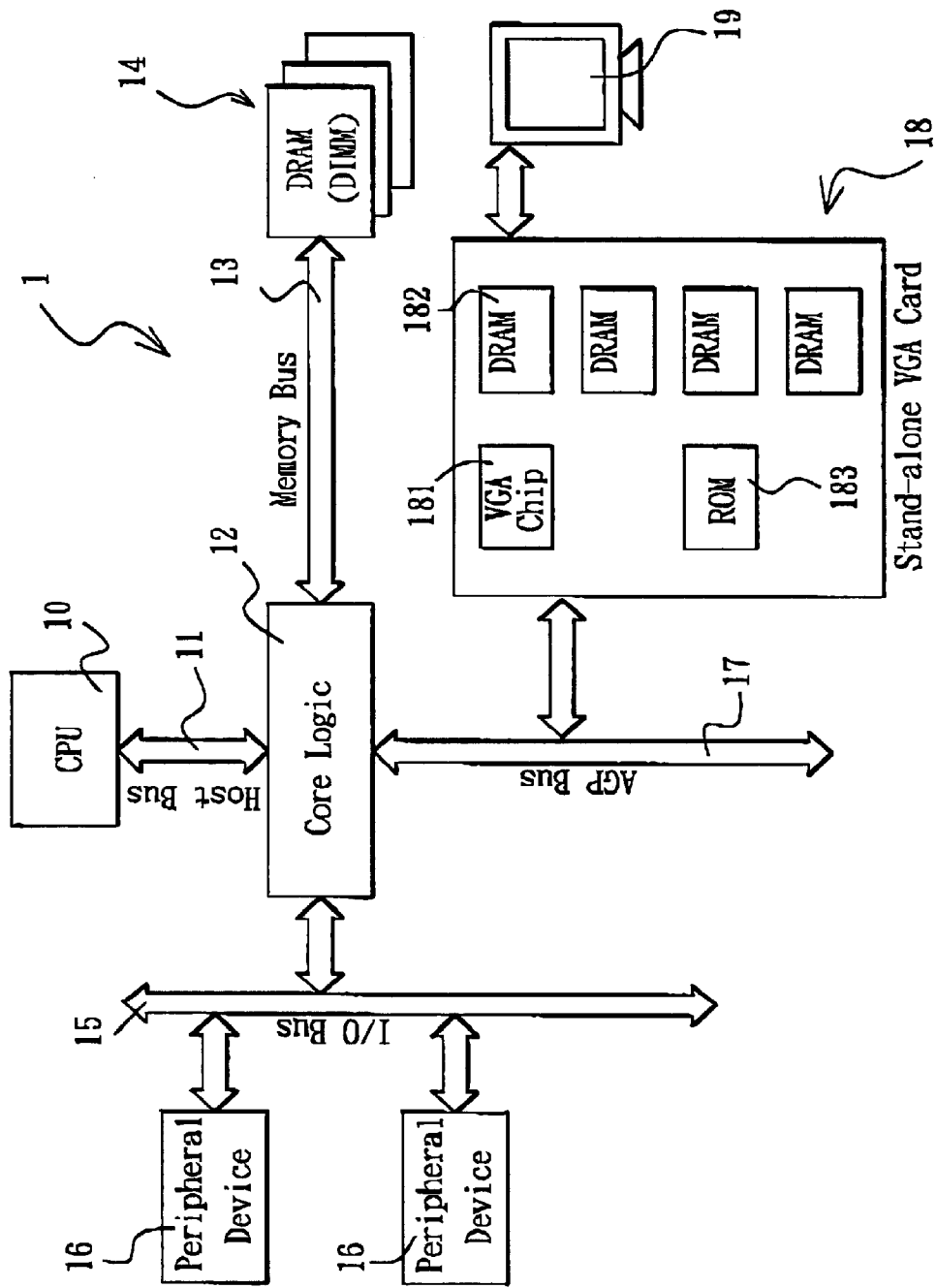
FIG. 1 is a schematic circuit block diagram of a conventional personal computer system that incorporates a stand-alone VGA card.
Figure 2:
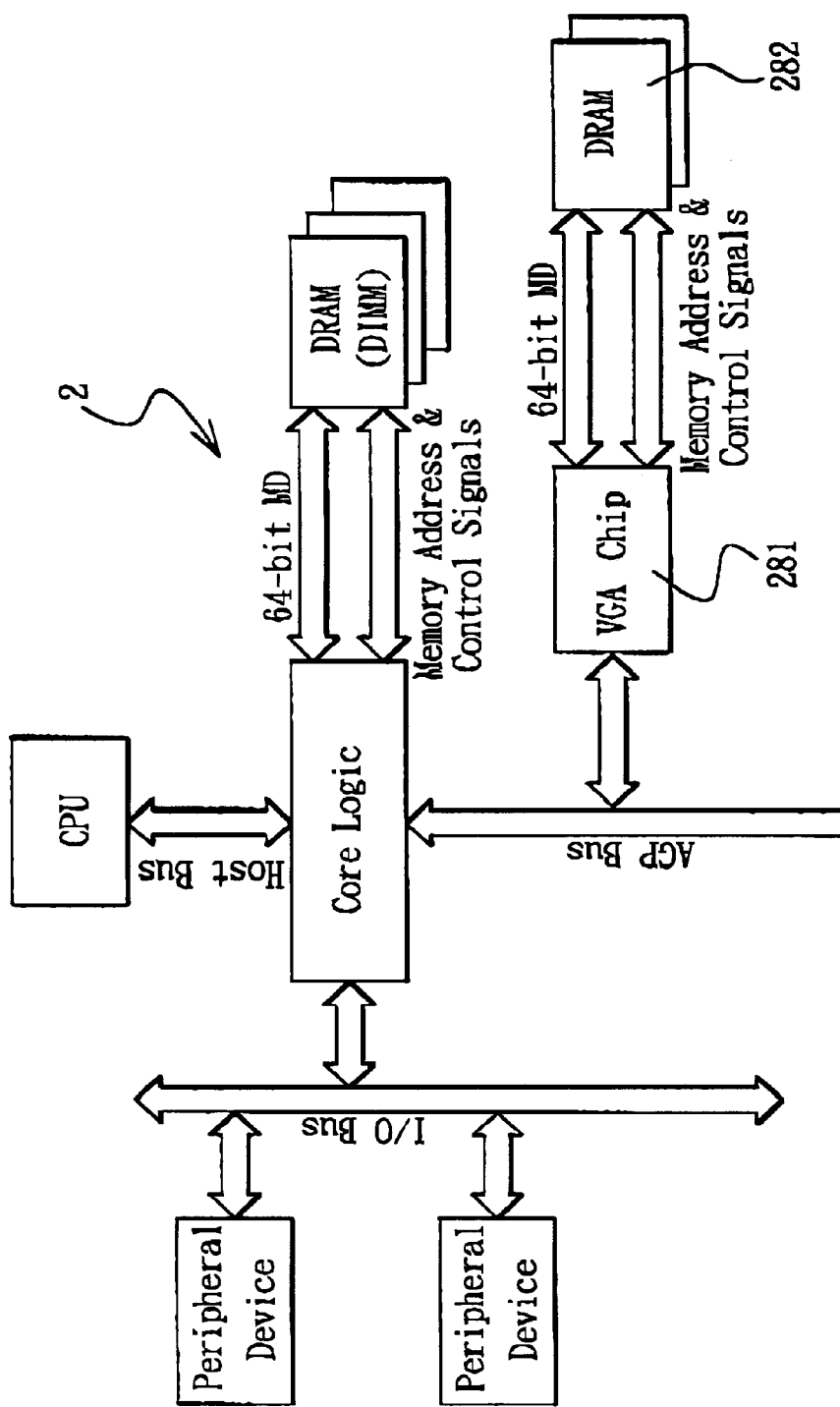
FIG. 2 is a schematic circuit block diagram of another conventional personal computer system that has a VGA chip and a local frame buffer mounted directly on a system board.
Figure 3:
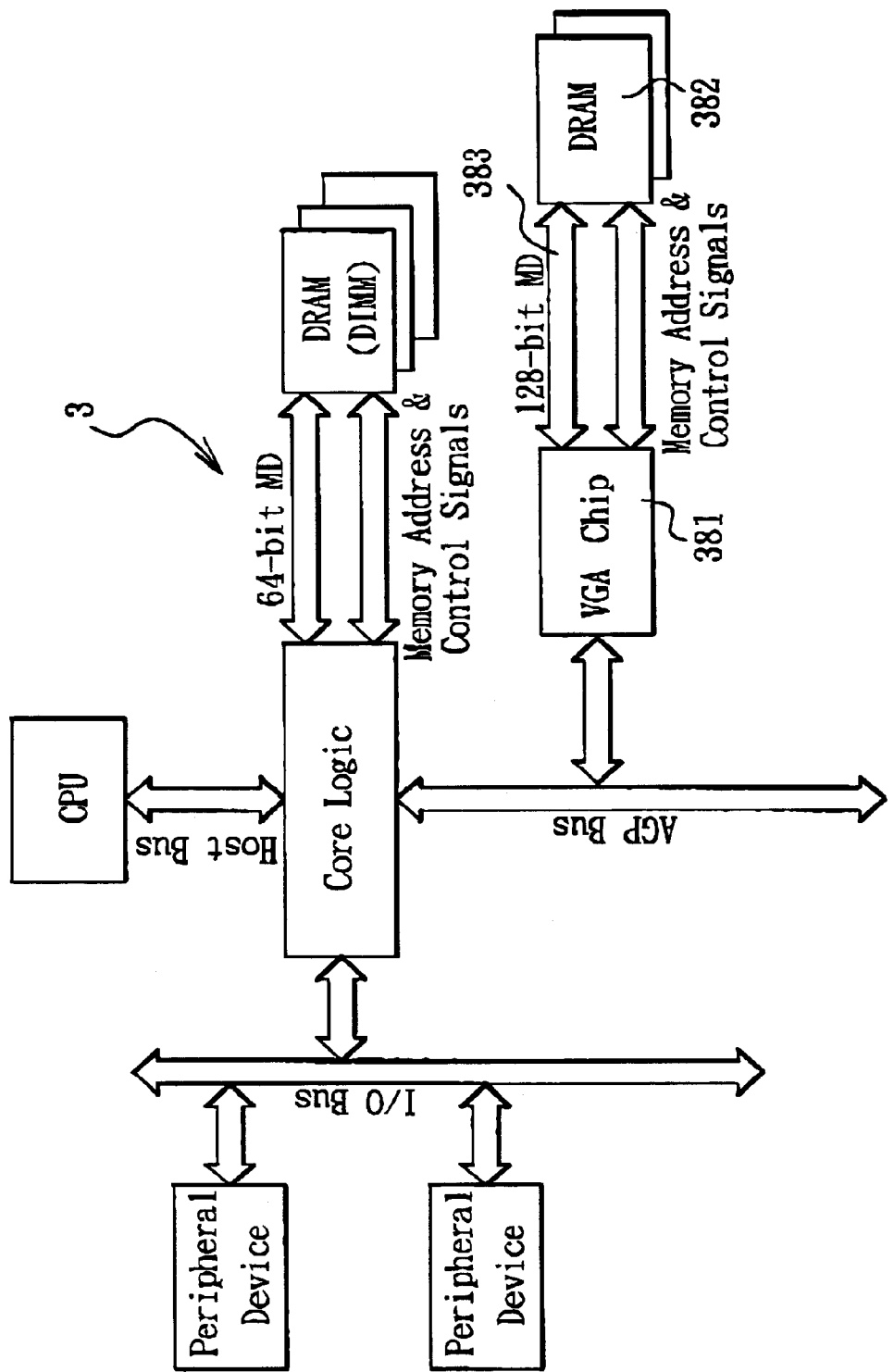
FIG. 3 is a schematic circuit block diagram illustrating the conventional personal computer system of FIG. 2 when modified to incorporate a 128-bit frame buffer memory data architecture.

Therefore, the computer system 4 of this invention provides the benefit of more memory access bandwidth associated with 128-bit frame buffer memory data lines for optimizing graphical performance at the lowest memory pin count so that flexibility of system board space/routing can be ensured. Aside from using the same set of address signals to access the memory pools 44, 48 simultaneously during VGA processing, it is noted that most of the control signals during memory access can also be shared by the memory pools 44, 48, thereby further reducing the size of the memory address and control signal bus 49. Furthermore, due to the presence of the VGA-dedicated frame buffer memory pool 48, the impact of a reduction in the size of the system memory pool 44, which is shared by both the core logic and graphic controller portions 421, 422, due to the use of a unified memory architecture can be minimized. As compared with the conventional computer systems of FIGS. 1 to 3, and the computer systems disclosed in the aforesaid co-pending U.S. patent applications, the computer system 4 of the present invention provides more flexibility in system board space/routing than the on-board VGA schemes utilized in the conventional computer systems of FIGS. 1 to 3, and more competitive VGA performance than the computer systems disclosed in the aforesaid co-pending U.S. patent applications. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A computer system comprising:
   an integrated core and graphic controller device including a core logic controller portion and a graphic controller portion;
   a system memory pool;
   a stand-alone frame buffer memory pool separate from said system memory pool;
   a first memory data bus interconnecting said integrated core and graphic controller device and said system memory pool;
   a second memory data bus interconnecting said integrated core and graphic controller device and said frame buffer memory pool; and
   a memory address and control signal bus interconnecting said integrated core and graphic controller device, said system memory pool and said frame buffer memory pool;

said graphic controller portion of said integrated core and graphic controller device being capable of generating a same set of address signals received by said system memory pool and said frame buffer memory pool via said memory address and control signal bus such that said graphic controller portion is able to access simultaneously first word part display data from said system memory pool via said first memory data bus and second word part display data from said frame buffer memory pool via said second memory data bus.

2. The computer system as claimed in claim 1, wherein each of the first and second word part display data is a quad-word part data.

3. The computer system as claimed in claim 2, wherein the first and second word part display data simultaneously accessed by said graphic controller portion from said system memory pool and said frame buffer memory pool from bi-quad-word display data.

4. The computer system as claimed in claim 3, wherein each of the first and second word part display data includes 64 data bits.

5. The computer system as claimed in claim 3, wherein the first word part display data is low word part display data, and the second word part data is high word part display data.

6. The computer system as claimed in claim 1, wherein said system memory pool is formed from standard DIMM, and said frame buffer memory pool is formed from discrete memory chips.

* * * * *